United States Patent [19]

Edelman

[11] Patent Number: 5,367,692
[45] Date of Patent: Nov. 22, 1994

[54] PARALLEL COMPUTER SYSTEM INCLUDING EFFICIENT ARRANGEMENT FOR PERFORMING COMMUNICATIONS AMONG PROCESSING NODE TO EFFECT AN ARRAY TRANSPOSITION OPERATION

[75] Inventor: Alan S. Edelman, El Cerrito, Calif.

[73] Assignee: Thinking Machines Corporation, Cambridge, Mass.

[21] Appl. No.: 707,366

[22] Filed: May 30, 1991

[51] Int. Cl.[5] .................... G06F 12/06; G06F 12/02; G06F 13/14

[52] U.S. Cl. ............................... 395/800; 364/240.1; 364/240.2; 364/229; 364/229.5; 364/230; 364/230.5; 364/242.94; 364/242.5; 364/268.7; 364/254.7; 364/DIG. 1; 364/DIG. 2

[58] Field of Search ............... 395/800, 275, 375, 425, 395/500, 325, 400, 200, 550, 725, 600, 21, 320, 575; 364/DIG. 1, DIG. 2

[56] References Cited

U.S. PATENT DOCUMENTS

| | | | |
|---|---|---|---|
| 4,730,322 | 3/1988 | Pollara-Bozzola | 395/21 |
| 4,891,787 | 1/1990 | Gifford | 395/375 |
| 5,072,371 | 12/1991 | Banner et al. | 395/200 |
| 5,105,424 | 4/1992 | Flaig et al. | 364/DIG. 1 |
| 5,113,523 | 5/1992 | Colley et al. | 395/800 |
| 5,170,482 | 12/1992 | Shu et al. | 395/800 |
| 5,170,484 | 12/1992 | Grondalski | 395/800 |

OTHER PUBLICATIONS

"Optimal Matrix Transposition and Bit Reversal on Hypercubes All-To-All Personalized Communication", Journal of Parallel and Distributed Computing, Alan Edelman, 1991.

Primary Examiner—Alyssa H. Bowler
Assistant Examiner—Daniel H. Pan
Attorney, Agent, or Firm—Richard A. Jordan

[57] ABSTRACT

A processing element array and a controller. The processing element array comprises a plurality of processing element nodes interconnected by a plurality of communications links in the form of a hypercube. Each processing element node has a memory including a plurality of storage locations for storing data, and in addition has a hypercube address. The controller controls the processing element nodes in parallel to enable the transfer of data items in a selected manner among the storage locations of the processing element nodes in a series of communications steps. The controller generates a base communications table and enables the processing element nodes to, in parallel, generate respective processing element node communications schedule tables as a selected function of the base communications table and the respective node's hypercube address. Each processing element node communications schedule table associates, for each of a plurality of iterations, storage locations of the processing element node's memory with a dimension of the hypercube. The controller then enables the processing element nodes to, in parallel in a series of transfer iterations, facilitate the transfer of data between storage locations identified in the processing element nodes' respective processing element node communications schedule tables and communications links of the associated dimension.

18 Claims, 5 Drawing Sheets

FIGURE 5

100. SEQUENCER GENERATES TABLE WITH ENTRIES IN "d" COLUMNS AND $2^{d-1}$ ROWS, WITH EACH ENTRY HAVING THE VALUE $n_i = 2i + 1$, WHERE "i" IS THE ROW NUMBER

↓

101. SEQUENCER, FOR EACH ENTRY (OTHER THAN COLUMN "d"), COMPLEMENTS BIT "j+1," WHERE "j" IS THE COLUMN IDENTIFIER

↓

102. SEQUENCER, FOR EACH ENTRY, INTERCHANGES THE LOW-ORDER BIT AND BIT "j," WHERE "j" IS THE COLUMN IDENTIFIER

PARALLEL COMPUTER SYSTEM INCLUDING EFFICIENT ARRANGEMENT FOR PERFORMING COMMUNICATIONS AMONG PROCESSING NODE TO EFFECT AN ARRAY TRANSPOSITION OPERATION

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis. for Parallel Processor, and assigned to the assignee of the present application, incorporated herein by reference.

U.S. patent application Ser. No. 07/043,126, filed Apr. 27, 1987, by W. Daniel Hillis, et al, now U.S. Pat. No. 4,984,235, for Method and Apparatus For Routing Message Packets, and assigned to the assignee of the present application, incorporated herein by reference.

U.S. patent application Ser. No. 07/520,701, filed May 8, 1990, by H. Mark Bromley, now U.S. Pat. No. 5,247,613, for Massively Parallel Processor Including Slice-Wise Communications Arrangement, and assigned to the assignee of the presnet application, incorporated herein by reference.

"Optimal Matrix Transposition And Bit Reversal On Hypercubes: All-To-All Personalized Communication", a published paper by the inventor hereof, incorporated by reference.

FIELD OF THE INVENTION

The invention relates generally to the field of massively parallel computer systems, and more particularly to communications arrangements for transferring data among processing elements in such systems.

BACKGROUND OF THE INVENTION

A computer system generally includes one or more processors, a memory and an input/output system. The memory stores data and instructions for processing the data. The processor(s) process the data in accordance with the instructions, and store the processed data in the memory. The input/output system facilitates loading of data and instructions into the system, and obtaining processed data from the system.

Most modern computer systems have been designed around a "von Neumann" paradigm, under which each processor has a program counter that identifies the location in the memory which contains its (that is, the processor's) next instruction. During execution of an instruction, the processor increments the program counter to identify the location of the next instruction to be processed. Processors in such a system may share data and instructions; however, to avoid interfering with each other in an undesirable manner, such systems are typically configured so that the processors process separate instruction streams, that is, separate series of instructions, and sometimes complex procedures are provided to ensure that processors' access to the data is orderly. Instruction sequences may also be shared among processors, which may require similar procedures to regulate use among the processors.

In Von Neumann machines, instructions in one instruction stream are used to process data in a single data stream. Such machines are typically referred to as SISD (single instruction/single data) machines if they have one processor, or MIMD (multiple instruction/multiple data) machines if they have multiple processors. In a number of types of computations, such as processing of arrays of data, the same instruction stream may be used to process data in a number of data streams. For these computations, SISD machines would iteratively perform the same operation or series of operations on the data in each data stream. Recently, single instruction/multiple data (SIMD) machines have been developed which process the data in all of the data streams in parallel. Since SIMD machines process all of the data streams in parallel, such problems can be processed much more quickly than in SISD machines, and generally at lower cost than with MIMD machines providing the same degree of parallelism.

The aforementioned Hillis patents and Hillis, et al., patent application disclose an SIMD machine which includes a host computer, a sequencer and an array of processing elements, each including a bit-serial processor and a memory. The host computer, inter alia, generates commands which are transmitted to the sequencer. In response to a command, the sequencer transmits one or more SIMD instructions to the array and global router. In response to the SIMD instructions, the processing elements perform the same operation in connection with data stored in their respective memories.

The array disclosed in the Hillis patents and Hillis, et al., patent application also includes two communications mechanisms which facilitate transfer of data among the processing elements. In one mechanism, the processing elements are interconnected in a two-dimensional mesh which enables each processing element to selectively transmit data to one of its nearest-neighbor processing elements. This mechanism, termed "NEWS" (for the North, East, West, and South directions in which a processing element may transmit data), the sequencer enables all of the processing elements to transmit, and to receive, bit-serial data in unison, from the selected neighbor.

The second mechanism is a global router, comprising a plurality of router nodes interconnected by communications links in the form of an N-dimensional hypercube. Each router node is connected to one or more of the processing elements. The global router transmits data in the form of messages provided by the processing elements. In one form of communication, each message contains an address that identifies the processing element that is to receive the message. The sequencer enables the processing elements to transmit messages, in bit serial format, from particular source locations in their respective memories to the router nodes. Each router node, also under control of the sequencer, upon receipt of a message, examines the address and determines therefrom whether the destination of the message is a processing element connected thereto, or a processing element connected to another router node. If the message is intended for a processing element connected to the router node, it delivers it to the processing element. If not, the router node determines from the address an appropriate communications link connected thereto over which it can transmit the message to a router node closer to the destination.

The global router can also transfer messages between router nodes without the use of addresses. This can permit the global router to emulate a mesh interconnection pattern of any selected number of dimensions, as described in U.S. patent application Ser. No.

07/042,761, filed Apr. 27, 1987, by W. Daniel Hillis, et al., and entitled "Method And Apparatus For Simulating M-Dimensional Connection Network In An N-Dimensional Network, Where M Is Less Than N" and assigned to the assignee of the present application. In such an emulation, for any mesh interconnection pattern having a particular number of dimensions, some router nodes connected to each router node, as selected according to a pattern described in the aforementioned application, are identified as "neighboring" router nodes in the mesh, with each of the identified router nodes being associated with a particular dimension of the mesh.

In addition, the global router can be used to generally transfer messages among router nodes without the use of addresses. In this operation, which is generally described in the aforementioned Bromley patent application, each router node, or the processing elements connected thereto, stores tables associating incoming messages with particular outgoing communications links. Using the tables, the router nodes pass messages, from node to node, until they reach the intended destinations.

SIMD machines are often used to perform mathematical operations on vectors or matrices of data values. In many algorithms involving matrices, it is typically advantageous to have each processing element process data items representing a column of a matrix, with successive processing elements in the processing array processing the successive columns of the matrix. That is, if "$a_{i,j}$" represents a location of a data item in a matrix, with "i" and "j" comprising row and column indices, respectively, then processing element "X" of the processing array processes all of the data items "$a_{X,j}$" of the matrix. Typically, each processing element will have a memory, with the data items "$a_{X,0}$" through "$a_{X,Y}$" of the successive rows zero through "Y" in the column "X" it is processing being stored in successive locations in its memory.

In matrix algorithms, it is often necessary to perform a transpose operation, in which the data items of the columns are reorganized into rows. Otherwise stated, in a transpose operations the data items in matrix locations "$a_{i,j}$" are transferred to matrix locations "$a_{j,i}$," that is, the data item in the "j-th" memory location of the "i-th" processing element is moved to the "i-th" memory location of the "j-th" processing element. If a matrix is large, the time required to determine an optimal sequence for moving the data items among processing elements can be quite large.

Similar problems arise in other types of computations, such as Fast Fourier Transform (FFT) computations. In performing an FFT, the data items are stored in vectors, which are divided among the processing elements in a similar manner. At various points in an FFT computation, the data items are transferred among the processing elements in a similar manner.

SUMMARY OF THE INVENTION

The invention provides a new and improved "all-to-all" communications arrangement for transferring data items among processing elements in a parallel computer.

In brief summary, a computer system comprises a processing element array and a controller. The processing element array comprises a plurality of processing element nodes interconnected by a plurality of communications links in the form of a hypercube. Each processing element node has a memory including a plurality of storage locations for storing data, and in addition has a hypercube address. The controller controls the processing element nodes in parallel to enable the transfer of data items in a selected manner among the storage locations of the processing element nodes in a series of communications steps. The controller generates a base communications table and enables the processing element nodes to, in parallel, generate respective processing element node communications schedule tables as a selected function of the base communications table and the respective node's hypercube address. Each processing element node communications schedule table associates, for each of a plurality of iterations, storage locations of the processing element node's memory with a dimension of the hypercube. The controller then enables the processing element nodes to, in parallel in a series of transfer iterations, facilitate the transfer of data between storage locations identified in the processing element nodes' respective processing element node communications schedule tables and communications links of the associated dimension.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 5 is a flow diagram detailing the operations performed in generating one of the data structures depicted in FIG. 4.

DETAILED DESCRIPTION OF AN ILLUSTRATIVE EMBODIMENT

Figure 1:
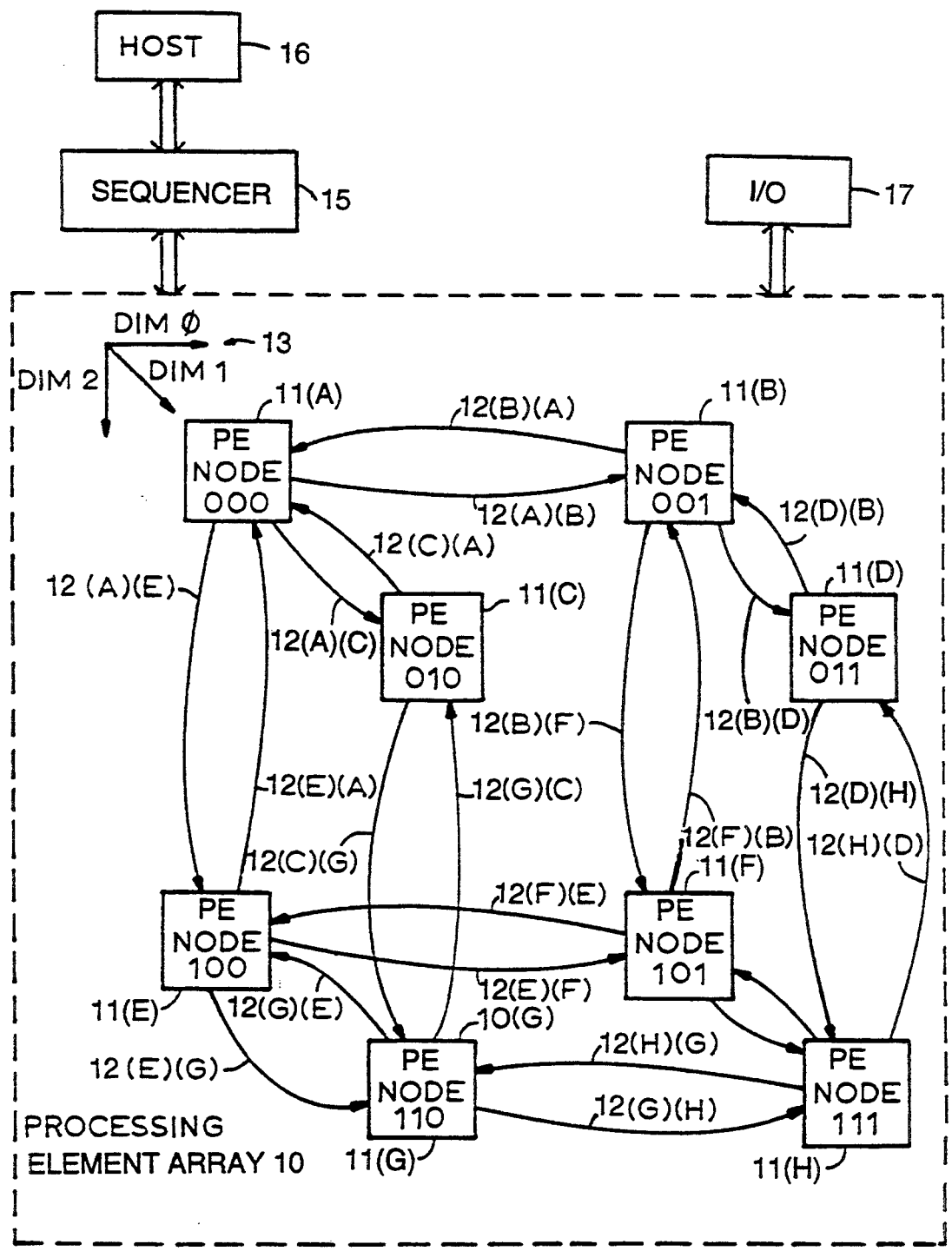
FIG. 1 is a block diagram of a portion of a computer system incorporating an all-to-all personalized communications arrangement in accordance with the invention.

FIG. 1 is a block diagram of a portion of a computer system incorporating a communication arrangement in accordance with the invention. The computer system includes a processing element array 10 comprising a plurality of processing element nodes, generally identified by reference numeral 11(x), interconnected by a plurality of communications links 12(x)(y). Eight processing element nodes 11(x) are shown in the processing element array 10 depicted in FIG. 1, identified by reference numerals 11(A) through 11(H), but it will be clear from the following that the processing element array 10 may include fewer, or many more, than eight processing element nodes 11(x). The structure of a processing element node 11(x) will be described in detail below in connection with FIG. 2; generally, in one embodiment a node 11(x) includes processing circuitry and communications link interface circuitry.

The communications links 12(x)(y) interconnect the processing element nodes 11(x) in the form of an "n"-dimensional hypercube. Each communications link 12(x)(y) transmits messages from one processing element node 11(x) (hereinafter referred to as a "source" processing element node) to another processing element node 11(y) (hereinafter referred to as a "destination" processing element node). In reference numeral 12(x)(y), the index "x" identifies the source processing element node 11(x) and the index "y" identifies the destination processing element node 11(y). As used herein, two processing element nodes 11(x) and 11(y) will be said to be "adjacent" if there is a pair of communications links 12(x)(y) and 12(j)(i) which interconnect them.

In the array 10 depicted in FIG. 1, the hypercube has three dimensions, as suggested by the grid 13 proximate processing element node 11(A). As is conventional in connection with hypercubes, the dimensionality of the hypercube and the number of processing element nodes are related, with the relation being that the number of dimensions corresponds to the logarithm, to the base two, of the number of processing element nodes in the hypercube. Since the eight processing element nodes 11(x) are shown in the processing element array 10 of FIG. 1, the processing element nodes 11(x) can be interconnected in a three-dimensional hypercube. It will be appreciated that the processing element array 10 may include many more processing element nodes 11(x) which may be interconnected by communications links 12(x)(y) to form a hypercube; preferably the number of processing element nodes 11(x) in the array 10 is a power of two, which facilitates interconnecting them in a regular hypercube having a number of dimensions corresponding to the logarithm, to the base two, of the number of processing element nodes.

The grid 13 has three arrows that are labeled "DIM 0," "DIM 1," and "DIM 2," each of which identifies one of the three dimensions DIM "i" in which "i" identifies the dimension. The directions of the hypercube dimensions, that is, the orientations of the particular communications links 12(x)(y) which correspond to the particular hypercube dimensions, differ for each processing element node 11(x), and is determined as follows. As shown on FIG. 1, each processing element node 11(x) is assigned a hypercube address, which is shown in binary form in FIG. 1. Each hypercube address has a number of binary digits corresponding to the number of dimensions in the hypercube. Thus, for example, processing element node 11(A) is assigned hypercube address "000," processing element node 11(B) is assigned hypercube address "001," and so on, with processing element node 11(H) being assigned hypercube address "111." The binary addresses are assigned to the processing element nodes 11(x) so that the binary addresses of adjacent processing element nodes differ in one bit location.

In each hypercube address, the right-most binary digit is the low-order digit in the hypercube address, with each successive digit towards the left being a progressively higher order digit, and the left-most binary digit being the high-order digit in the hypercube address. The dimension of the communications link 12(x)(y) interconnecting adjacent nodes corresponds to the order of the digit in the binary addresses that is different. Thus, as shown in FIG. 1, the binary addresses of processing element node 11(A) and processing element node 11(B) differ in the low (zeroth) order digit, and so the hypercube dimension from processing element node 11(A) to processing element node 11(B) is the DIM 0 dimension zero, as shown in grid 13. Similarly, the binary addresses of processing element node 11(A) and processing element node 11(C) differ in the next (first) order digit, and so the hypercube dimension from processing element node 11(A) to processing element node 11(C) is DIM 1 dimension one, also as shown in grid 13. Finally, the binary addresses of processing element node 11(A) and processing element node 11(E) differ in the high (second) order digit, and so the hypercube dimension from processing element node 11(A) to processing element node 11(E) is DIM 2 dimension two.

The hypercube dimensions from each processing element node 11(x) to its adjacent nodes are determined in a similar manner. It will be appreciated that, for the communications link 12(x)(y) from a processing element node 11(x) to another processing element node 11(y) that is associated with a particular dimension for the node 11(x), the communications link 12(j)(i) from the processing element node 11(y) to the processing element node 11(x) is associated with the same dimension. This is a result of the fact that the hypercube addresses of the processing element nodes 11(x) and 11(y), for each pair of adjacent nodes, will differ in the same order hypercube address bit, which order determines the dimension for each processing element node.

In one particular embodiment, the computer system also includes a sequencer 15, which is controlled by a host computer 16. To accomplish processing, the host computer 16, in response to a request from an applications or system program being processed thereby, transmits signals representing a command to the sequencer 15. In response to a command, the sequencer 15 may transmit a number of signals, as detailed below in connection with FIG. 2, to control the processing element nodes 11(x) of processing element array 10 in parallel. The processing element nodes 11(x) may also generate status signals, which they couple to the sequencer 15 to notify it of the status of the operations enabled by the sequencer. The sequencer 15 may also provide status signals to the host computer 16 to notify it of the status of the processing of the command. In addition, the computer system may include one or more input/output systems, generally identified by reference numeral 17. The input/output systems may include, for example, mass data storage devices, frame buffers, printers, or the like, which supply data to the processing element array 10 for processing, or which receive data therefrom for storage, display, and so forth.

Figure 2:
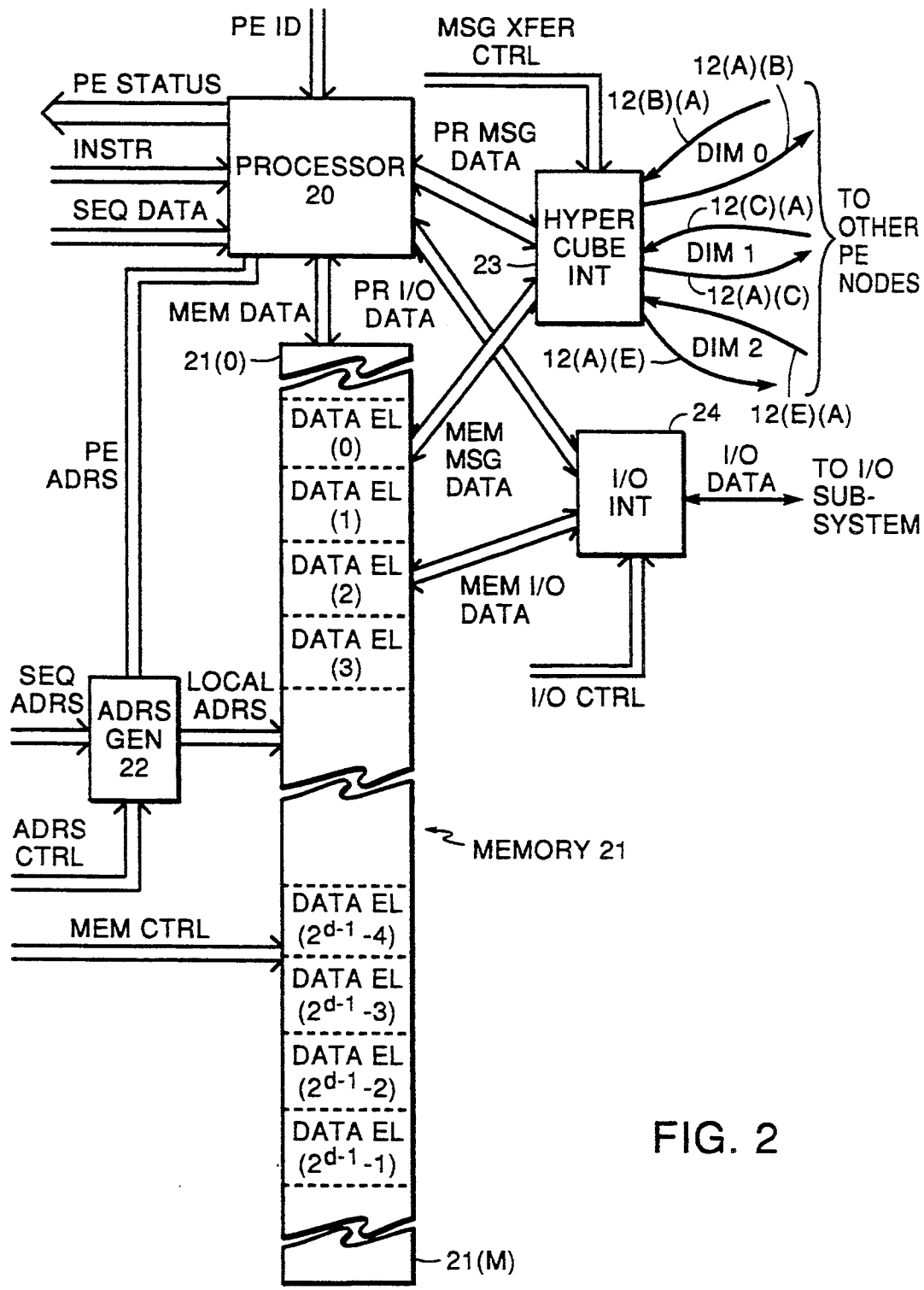
FIG. 2 is a functional block diagram of a processing element node useful in the processing array of the computer system depicted in FIG. 1.

The processing element nodes 11(x) of processing element array 10 are all similar, and so only node 11(A) will be described in detail. FIG. 2 depicts a functional block diagram of processing element node 11(A). The processing element node 11(A) includes a processor circuit 20 which, in response to the INSTR instruction signals performs processing operations in connection with SEQ DATA sequencer data signals representing data from sequencer 15 and MEM DATA signals representing data from a memory 21. During processing, the processor circuit 20 may generate data coupled to the memory 21 as MEM DATA signals for storage therein. In addition, the processor 20 also receives PE ID processor identification signals, which identify the processor's hypercube address. The processor 20 may, in response to INSTR instruction signals from the sequencer 15, use the PE ID signals in processing.

The memory 21 operates under control of MEM CTRL memory control signals from the sequencer 15 to control reading of data therefrom to the processor 20, to a hypercube interface circuit 23 or to an input/output interface circuit 24. In addition, the MEM CTRL memory control signals control storage of data in the memory 21, which it may receive from the processor 20, from the hypercube interface circuit, or from the input/output interface circuit 24. The memory 21 includes a plurality of addressable storage locations 21(0) through 21(M) [generally identified by reference numeral 21(z)], which actually store the data. Each addressable storage location is identified by a particular encoding of LOCAL ADRS local address signals generated by an address generator 22, and the memory 21 uses the LOCAL ADRS signals to identify particular storage locations 21(z) from which data is read or in which data is stored.

The address generator 22 generates the LOCAL ADRS signals in response to SEQ ADRS sequencer address signals from the sequencer 15 and PE ADRS processing element address signals from the processor 20, under control of ADRS CTRL address control signals from the sequencer 15. The ADRS CTRL address control signals may enable the address generator 22 to couple the SEQ ADRS sequencer address signals directly to the memory 21 as the LOCAL ADRS signals. Since the SEQ ADRS signals and the ADRS CTRL signals are coupled to all of the processing element nodes 11(x) in parallel, when that occurs the sequencer is essentially controlling all of the processing element nodes 11(x) to, in parallel, process data from the same locations in their respective memories 21. Alternatively, the ADRS CTRL address control signals may enable the address generator 22 to couple the PE ADRS processing element address signals to the memory 21, in which case the addressing is completely determined by the processing element node 11(x).

In addition, the ADRS CTRL address control signals may enable the address generator 22 to use both the SEQ ADRS sequencer address signals and the PE ADRS processing element address signals in generating the LOCAL ADRS signals, to permit the processing element nodes 11(x) to, in parallel, process data from diverse locations in the respective memories. When that occurs, the SEQ ADRS may represent, for example, a base address of a data structure which is transmitted to all of the processing element nodes 11(x) in parallel, and the PE ADRS processing element address signals may be used as an offset to identify a particular element of the data structure to be used by the particular processing element node 11(x). The processing element nodes 11(x) may have diverse offsets, so that different elements of the data structure, stored in diverse locations 21(z) in their respective memories 21, may be processed in parallel.

The input/output interface circuit 24 provides the interface to the input/output subsystems 17. The input/output interface circuit 24 operates in response to I/O CTRL input/output control signals from the sequencer 15 to couple PR I/O DATA processor input/output data signals from processor 20 or MEM I/O DATA memory input/output data signals from memory 21, to the input/output subsystems 17 as I/O DATA signals. In addition, the I/O CTRL input/output control signals may enable the input/output interface 24 to couple the I/O DATA signals to the processor 20 or memory 21 as PR I/O DATA or MEM I/O DATA signals, respectively.

The hypercube interface circuit 23 provides the interface to the hypercube communications links 12(x)(y). The hypercube interface circuit 23 receives messages from a message source at the processing element node 11(A) and, under control of MSG XFER CTRL message transfer control signals from the sequencer 15, transmits them over the communications links 12(x)(y) to other processing element nodes 11(B), 11(C) and 11(E) connected thereto. Contemporaneously, the hypercube interface circuit 23, under control of the MSG XFER CTRL message transfer control signals, receives messages from other processing element nodes connected thereto over the communications links, which it transfers to the processor 20 or the memory 21. The message sources at the processing element node 11(x) may comprise, for example, the processor 20 or the memory 21.

FIG. 2 identifies the signals defining messages coupled between the processor 20 and the hypercube interface 23 as PR MSG DATA processor message data signals, and the signals defining messages coupled between the memory 21 and hypercube interface as MEM MSG DATA memory message data signals. In one particular embodiment, the MEM MSG DATA and PR MSG DATA signals comprise a plurality of signals coupled in parallel between the memory 21 or processor 20, on the one hand, and the hypercube interface 23, on the other hand.

In one embodiment, messages are transferred among the processing element nodes 11(x) in two operational modes. In one operational mode, each message includes an address as well as data. In that operational mode, the hypercube interface 23 uses the address to identify a communications link 12(x)(y) over which it should transmit the message to forward it toward the destination processing element node 11(y). When a hypercube interface at a processing element node receives a message from another processing element node, it examines the address to determine if that node is the destination processing element node 11(y), and, if so, it delivers the message to either the processor or memory at that node. However, if the hypercube interface 23 determines from the address that that node is not the destination processing element node 11(y), it also identifies from the address a communications link 12(x)(y) over which it should transmit the message to forward it toward the destination processing element node 11(y). Thus, the hypercube interfaces at each node forward messages from node to node until they reach the destination processing element node 11(y). As noted above, since the sequencer 15 is providing the MSG XFER CTRL message transfer control signals to the hypercube interfaces 23 of all of the processing element nodes 11(x) in parallel, the hypercube interfaces 23 are all performing substantially the same operations, conditioned on their having messages to transmit or receive. For one embodiment, this operational mode is generally described in the aforementioned Hillis patents and Hillis, et al., patent application.

In the other operational mode, the messages do not include an address portion. Instead, the hypercube interface 23 associates the particular outgoing communications link for a particular dimension with particular ones of the MEM MSG DATA memory message data or PR MSG DATA processor message data signals. For one embodiment, this operational mode is generally described in the aforementioned Bromley patent application. In that embodiment, for example, the hypercube interface 23 may transmit the low order ones of the MEM MSG DATA signals or PR MSG DATA signals over the zeroth dimension communications link 12(A)(B), the middle-order ones of the signals over the first dimension communications link 12(A)(C), and the high-order ones of the signals over the third dimension communications link 12(A)(E). The hypercube interface 23, upon receiving messages from the communications links associated with the various dimensions, may also couple them as the respective-order ones of the MEM MSG DATA or PR MSG DATA signals to the processor 20 or to memory 21.

In this operational mode, to enable transfer of messages among processing element nodes 11(x) which may not be adjacent, the sequencer 15 may enable these operations to be performed sequentially. During each iteration, the processing element nodes 11(x) may use tables, which may be stored in their respective memories 21, to associate incoming and outgoing communications links 12(x)(y) of particular dimensions with particular storage locations 21(z) for each iteration. The processor 20 provides information from the table to the address generator 22 as PE ADRS processing element address signals to facilitate its generating LOCAL ADRS local address signals to, in turn, identify the locations in memory 21 from which the message data is transferred to the hypercube interface 23 and into which message data from the hypercube interface 23 is stored.

The invention facilitates performance by the computer system of transfers of messages containing diverse data items from all of the processing element nodes 11(x) to all of the processing element nodes 11(x), in a regular manner, quickly and efficiently, using the second message transfer operational mode described above. This "all-to-all personalized communication" may be useful in performing, for example, a matrix transpose or similar operation. As noted above, and with reference here also to FIG. 2, each processing element node 11(x) processes matrix data from, for example, one column of the matrix. Using that example as illustrative, a processing element node will transfer data items in locations $a_{i,j}$ of the matrix, where "i" is the row index and "j" is the column index, for "x" equal to "j". A processing element array 10 having a dimension "d" will conveniently accommodate a square matrix having $2^d$ rows by $2^d$ columns of data items in locations $a_{i,j}$, where "i" and "j" have values between zero and "$2^d-1$". In that case, each of the columns is processed by one of the $2^d$ processing element nodes 11(x), and each processing element node processes a sequence of $2^d$ data items, representing a data items of a column of the matrix, which may be stored in memory 21 in successive storage locations. The invention facilitates transfer by the processing element nodes 11(x) of the data item in respective locations $a_{i,j}$ thereamong so as to re-arrange the data items, with the result that the data item in the location $a_{i,j}$, which is originally located in the "i-th" location of processing element node "j," is moved to location $a_{j,i}$, which is the "j-th" location of processing element node "i." Furthermore, the invention facilitates such an operation by generating optimum transfer schedules, or tables, which facilitate the transfer operation in the minimum number of steps, and for which the time required to generate the tables is short compared to the time required to actually perform the transfer operation.

Figure 3:
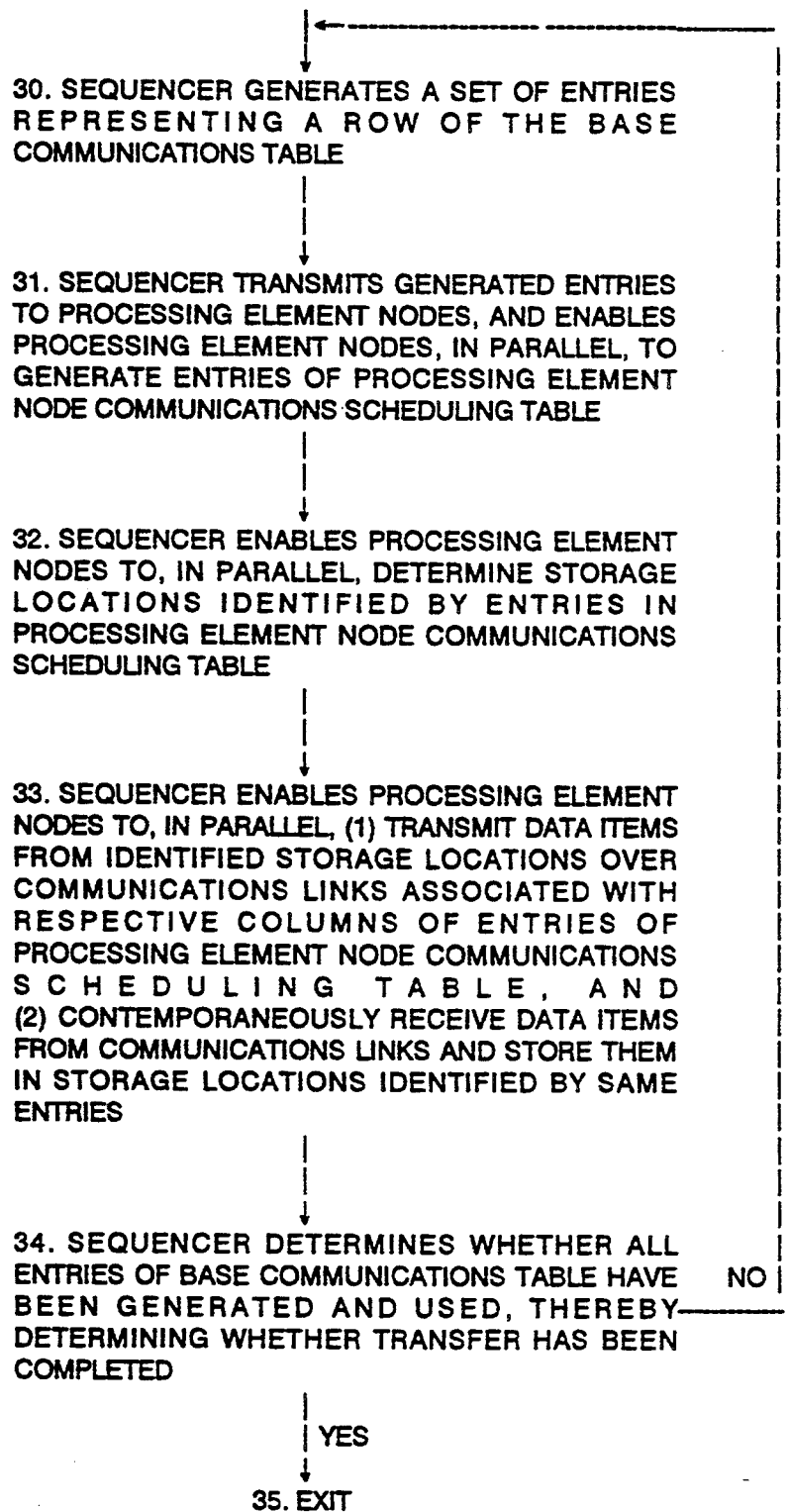
FIG. 3 is a flow diagram useful in understanding the operations performed by the computer system depicted in FIG. 1.
Figure 4:
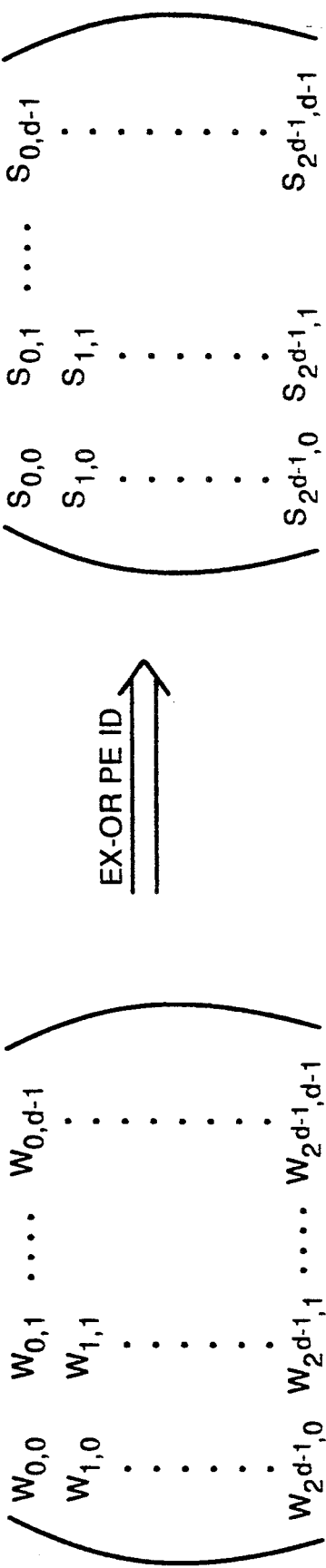
FIG. 4 is a diagrams detailing data structures useful in understanding the flow operations depicted in FIG. 3.

In performing a matrix transpose operation in accordance with the invention, the sequencer operates in a plurality of iterations, during each iteration enabling the processing elements of the processing element array 10 to also perform a series of iterations which will be described in connection with FIG. 3. To facilitate a matrix transpose in response to a command from the host 16, the sequencer 15 generates entries for a base communications table 50 which is used by the processing element nodes 11(x) in controlling transfers of the data items comprising the matrix over the communications links 12(x)(y) to facilitate the transfers to perform the transpose (step 30). The base communication table 50 is generally depicted in FIG. 4. With initial reference to FIG. 4, base communications table 50 includes a plurality of entries "$w_{i,j}$" arranged in a series of rows and columns. Each row of the table 50 is associated with one of a series of communications steps, and each column is associated with a dimension of the hypercube. The procedure used by sequencer 15 to generate base communications table 50 in one embodiment will be described below in connection with FIG. 5.

In one embodiment, in step 30 the sequencer 15 initially generates entries $w_{0,j}$ comprising one row of the base communications table 50. The sequencer 15 then, using the entries $w_{0,j}$ of the row of the base communications table 50 so generated, enables the processing element nodes 11(x) to, in parallel, generate entries $s_{0,j}$ comprising a row of a processing element node communications scheduling table 60 (step 31). In that operation, the sequencer 15 iteratively transmits the successive entries $w_{0,j}$ of the row of the base communications table 50, as, for example, SEQ DATA sequencer data signals to the processing element nodes 11(x). Contemporaneously, for each entry of table 50, the sequencer enables processing element nodes 11(x) to perform a bit-wise exclusive OR operation between the entries of the table 50, as represented by the SEQ DATA signals, and the binary representation of their respective hypercube addresses as represented by their PE ID processing element identification signals.

The result of each exclusive-OR operation is an entry $s_{0,j}$ of the processing element node's respective processing element node communications scheduling table 60. Generally, as depicted in FIG. 4, each processing element node communications scheduling table 60 has the same general structure as the base communications table 50, with processing element node-specific communications identifier entries $s_{i,j}$ arranged in a plurality of rows and columns. Each entry $s_{i,j}$ identifies an offset to be used, along with a base address provided by the sequencer 15, to identify a location in the memory 23 of the processing element node 11(x) containing a data item that is to be transmitted over the communications link 12(x)(y) associated with the dimension "j" of element $s_{i,j}$ during the "i-th" communications step, which location is also to be used in storing the data item received from the communications link 12(y)(x) associated with the same dimension.

After the sequencer 15 has enabled the processing element nodes 11(x) to generate the entries $s_{0,j}$ comprising the row of their processing element node communications scheduling tables 60, it enables the processing element nodes 11(x) to use the respective rows of the processing element node communications scheduling tables 60 in parallel generated in step 31 to transfer the data items of the matrix. In this operation, the sequencer enables the processing element nodes 11(x) touse the just-generated entries $s_{0,j}$ to identify locations in memory from which data items are to be transmitted over the communications links 12(x)(y) of the respective dimensions, and into which data items received from the same communications links $12(x)(y)$ are to be stored (step 32).

In identifying the storage locations (step 32), the sequencer 15 enables the processors 20 of the processing elements $11(x)$ to successively retrieve the entries $s_{0,j}$ and use them in generating PE ADRS processing element address signals for the address generator 22. The sequencer 15 will also supply SEQ ADRS sequencer address signals to point to the base address of the data items in the memories 21 of processing element nodes $11(x)$ comprising containing the matrix to be transposed, which will be the same for all of the processing element nodes. The PE ADRS signals for each entry of the table 60 the processing element nodes effectively represent offsets from the base address represented by the SEQ ADRS signals, and the LOCAL ADRS local address signals generated by the address generator 22 represent, for each entry of the table 60, the sum of the values represented by the SEQ ADRS signals and PE ADRS signals.

In addition, the sequencer 15 enables the processing element nodes $11(x)$ to, in parallel, transmit the data items identified by the entries $s_{0,j}$ from all of the storage locations in their respective memories over the communications links $12(x)(y)$ associated with the respective dimensions (step 33). In this operation each processing element node $11(x)$ transmits the data item identified by the entry in the column of table 60 associated with the respective-order dimension over the communications link $12(x)(y)$ associated with the corresponding-order dimension. Contemporaneously, each processing element node $11(x)$ stores data received over the communications links $12(x)(y)$ associated with the respective dimensions in the same memory location from which it transmitted a data item.

The sequencer 15 enables all of the processing element nodes $11(x)$ to, in parallel, perform the same iteration. This ensures that, when one node is transmitting a data item from a memory location over a communications link associated with a particular dimension, it will contemporaneously receive a data item from the communications link associated with the same dimension which it stores in the same memory location, in which case no data item will be lost or over-written. After the sequencer 15 has enabled the processing element nodes $11(x)$ to transmit data items from, and load data items into, storage locations pointed to by the entries in a row of processing element node communications scheduling table 60, it determines whether all of the entries of all rows of the base communication table have been generated and used to determine whether the transfer operation has been completed (step 34). If not, the sequencer 15 returns to step 30 to repeat the operations in connection with the entries $w_{i,j}$ and $s_{i,j}$ in the next rows of the base communications table 50 and processing element node communications scheduling table 60, respectively. The sequencer repeats steps 30 through 34 until it determines that the entries $w_{i,j}$ and $s_{i,j}$ of all rows of the tables have been generated and used, at which point the transpose operation will be complete, and it at that point exits (step 35). In addition, the sequencer 15 may transmit status information to the host 16 concerning the transpose operation.

By way of background, as noted above, the objective of the matrix transpose is to rearrange data items so that data item stored in a location $a_{i,j}$ is moved to location $a_{j,i}$. This is accomplished by the sequencer 15 generating the rows of the base communications table 50, and enabling the processing element nodes $11(x)$ to generate the rows of the processing element node communications scheduling tables 60, in recognition of the following. The value of the exclusive OR of the indices "i" and "j," representing, respectively, the offset of the storage location $21(z)$, relative to the base of the matrix in the respective memories 21, and the hypercube address of each data item at the beginning of the transpose operation, is the same as the value of the exclusive OR of the indices "j" and "i" of the data item at the end of the transpose operation. The matrix transposition can be accomplished by transfers among the processing element nodes such that, for each data item, at each of the successive step in the transpose operation:

(1) the value of the exclusive-OR of the hypercube address of the processing element node with offset of the location in memory 21 from which the data item is transferred, equals (2) the value of the exclusive-OR of the hypercube address of the processing element node with the offset of the location in memory 21 into which it is stored, which will ensure that the overall exclusive-OR requirement for the transpose operation as noted above is satisfied. Tables 50 and 60 can be generated so that after $2^{d-1}$ iterations the matrix will be transposed. The exclusive-OR operation initiated by the sequencer 15 to establish the processing element node communications scheduling tables 60 ensures that the value of the exclusive-OR of the addresses is maintained constant for each data item as it is transferred among the processing element nodes in the various iterations.

As noted above, FIG. 4 depicts the structure of the base communications table 50. With reference to FIG. 4, the base communications table comprises a plurality of entries, identified generally as "$w_{i,j}$" organized in columns zero through "d-1" and rows zero through "$2^{d-1}$-1," where "d" is the dimension of the hypercube. Each column is associated with one dimension of the hypercube, in particular, the dimension identified by the column index "j" within the table 50. In addition, the successive rows of the table 50, which are identified by index "i," are associated with the successive $2^{d-1}$ iterations of the transfer operation required to perform the matrix transpose operation.

The sequencer 15 generates the entries $w_{i,j}$ for the base communications table 50 to have the following characteristics. First, "$w_{i,k}{}^k=1$," that is, the "k-th" bit of the binary representation for $w_{i,k}$ is a "one." Other bits of the representation may also be "one." If the base communications matrix 50 conforms to this condition, the data items from a respective storage locations of the memories 21 of the processing elements will be transferred over the appropriate hypercube dimensions.

Second, the sequencer 15 generates the entries $w_{i,j}$ so that, within a row, no two entries $w_{i,j}$ have the same value, that is, $w_{i,j1} \neq w_{i,j2}$ if $j_1 \neq j_2$. If the base communications matrix 50 conforms to this condition, no two entries $s_{i,j}$ in the same row of the processing element node communications scheduling table 60 will have the same value, which provides that a processing element node $11(x)$ will not transmit the contents of a storage location over two communications links $12(i)(j_1)$ and $12(i)(j_2)$ at the same time. This ensures that each data item in the matrix proceeds along a single path from the source location to the final transposed destination location.

Third, the sequencer 15 generates the base communications table 50 so that, within a column, no two entries have the same value, that is, $w_{i1,j} \neq w_{i2,j}$ if $i_1 \neq i_2$. If the base communications matrix 50 conforms to this condition, no two entries $s_{i,j}$ in the same row of the processing element node communications scheduling table 60 will have the same value, which ensures that a processing element node 11(x) will not transmit the contents of a storage location over the same communications link 12(x)(y) during two different steps of the transpose operation. If two entries did have the same value, a processing element node 11(x) at some step would transmit a matrix element over the same communications link 12(x)(y) over which it, during a previous step, received the matrix element, in which case the data item would be back-tracked rather than proceeding to the processing element node 11(y) required to accomplish the transpose. If the base communications matrix 50 conforms to all three conditions, the processing element node communications scheduling table 60 will ensure that the processing element nodes 11(x) will transpose the matrix data items in $2^{d-1}$ steps.

It will be appreciated that the base communications table 50 is effectively the same as the processing element node communications scheduling table 60 for the processing element node 11(A) with hypercube address "000." This is clear from the fact that the exclusive-OR operation of the entries $w_{i,j}$ of the base communications table 50 performed by the processing element node 11(A) with its hypercube address will provide entries $s_{i,j}$ which have the same values. The communications arrangement effectively takes advantage of symmetries inherent in performing all-to-all communications using a hypercube interconnection network The invention further facilitates the generation of the base communications table 50 in an expeditious manner, so that the time required to generate the tables 50 and 60 is small in relation to the time required to perform the transfer operation. FIG. 5 depicts a flow diagram detailing the sequence of operations performed by sequencer 15 in one embodiment in generating the base communications matrix 50. It will be appreciated that the base communications matrix 50 is not necessarily unique; that is, diverse base communications matrices 50, having array elements $w_{i,j}$ of diverse values, may be useful as long as they meet the three conditions noted above. However, if the base communications table 50 is generated according to the sequence depicted in FIG. 5, the entries of the generated base communications matrix 50 will satisfy the conditions noted above.

In addition, while it will be appreciated that the time required to generate the respective rows of the base communications matrix 50 for the successive iterations will vary in relation to the number of dimensions and the number of required steps, which, in turn, will vary in relation to the size of the matrix to be transposed, the sequence depicted in FIG. 5 facilitates the generation of each row in a time that is short in relation to the time required to enable the processing array 10 to actually transfer the data during the iteration. In addition, since the processing element nodes 11(x) generate the respective rows of the processing element node communications scheduling tables 60 in parallel, each as the exclusive-OR of the entries of the row of the base communications table 50 and its respective hypercube addresses, the time required to generate the rows processing element node communications scheduling table 60 will be directly related to the number of entries in each row of the base communications table 50 and the time required to perform a single exclusive-OR operation, which will also be short in relation to the time required to transfer the data items.

With reference to FIG. 5, in generating the base communications matrix 50, the sequencer 15 initially generates a working table having a plurality of entries organized in "d" columns and $2^{d-1}$ rows, wherein "d" corresponds to the number of dimensions in the hypercube (step 100). Each row is identified by an index "i," with the values of "i" extending from zero to "$2^{d-1}-1$." All of the entries in a row have the same binary-encoded value $n_i$ related to the row's index, that is, $n_i = 2i+1$. It will be appreciated that the sequencer 15 can quickly generate the binary-encoded value of the entries in each row from the index for the row by shifting the bits comprising the binary-encoded value of the row index to the respective next higher-order bit locations (which effectively multiplies the value of the index by two), and setting the low order bit (which effectively adds one).

Thereafter, the sequencer 15, for the working table entries in each column "j" complements bit "j+1" of the entries' representations (step 101). Thereafter, the sequencer 15, for each working table entry, interchanges the low-order bit and bit "j" (step 102). The resulting value is the entry $w_{i,j}$ in the base communications table 50.

It will be appreciated that the sequencer 15 may perform steps 101 and 102 in succession in connection with each working table entry before going to the next working table entry. Alternatively, the sequencer 15 may perform step 101 in connection with all of the working table entries, followed by step 102 in connection therewith.

In addition, since number of bits required to uniquely identify the $2^d$ data items in each processing element node's memory 21 is "d," the entries in the working table can be comprised of at most "d" binary digits. Accordingly, step 101 need not be performed in connection with the working table column associated with the hypercube dimension "d," since the entries in the working table do not include a "d+1"st binary digit, which would be manipulated in that step.

It will be further appreciated that the sequence depicted in FIG. 5 generates a base communications table 50 whose entries $w_{i,j}$ satisfy the three conditions noted above. First, since the low-order bit in each working table entry is always set, the interchange of step 102 guarantees that the "k"th bit of each entry $w_{i,k}$, that is, $w_{i,k}{}^k$, is always set. Furthermore, within a column, since the values for the entries are based on the values of the indices for the respective rows in step 100, in which the same order bit is complemented (step 102) and interchanged (step 103), the values within a column are unique. In addition, the complementing step 102 ensures that the values of the entries within a row are unique.

As described above, the all-to-all personalized communication arrangement performs a matrix transpose in connection with data items in locations $a_{i,j}$ of the respective memories 21 of processing element nodes 11, to transfer each item to respective locations $a_{j,i}$. It will be recognized that "i" and "j", identified above as indices in the matrix, effectively correspond to elements of addresses $<i|j>$ in the processing element array, where "|" indicates a concatenation of "i" with "j". In that connection, the high-order portion of the address, "i," identifies the processing element node 11 and the low-order portion of the address, "j," identifies the storage location 21(z) in the node, for the data item. The transposition results in each data item in address $<i|j>$ being transferred to address $<j|i>$, where all of the bits of the binary representation of the address portions have been interchanged.

The arrangement may also be used to interchange fewer than all bits of the high-order portion with fewer than all bits of the low-order portion. That is, if the binary representations for the addresses for the data items have the form:

$$<i_N, \ldots, i_K, \ldots, i_J, \ldots, i_0 | j_M, \ldots j_K, \ldots, j_J, \ldots, j_0>$$

the arrangement will transfer the data items so that the address bits "J" through "K" of the high- and low-order portions binary representations of the addresses are interchanged, that is, $$<i_N, \ldots, i_{K+1}, j_K, \ldots, j_J, i_{J-1}, \ldots, i_0 | j_M, \ldots j_{K+1}, i_K, \ldots, i_J, j_{J-1}, \ldots, j_0>.$$

In these address representations, it will be appreciated that each high order address bit $i_x$ is associated with the hypercube dimension "x." In the transfer operation, the sequencer 15 performs the same steps described above in connection with FIGS. 3, 4 and 5, except that during the transfer portion of the operation, in particular step 33, the sequencer 15 during each iteration enables the processing element nodes 11 to transfer the data items in the storage locations identified by the entries $s_{i,j}$ identified in the columns of the processing element node communications scheduling table 60 associated with dimensions "J" through "K" of the portions of the address to be interchanged, over the communications links 12 associated with those dimensions.

In addition, during the same iteration, the sequencer 15 enables the processing element nodes 11 to transfer data items in storage locations identified by entries $s_{i,j}$ of columns of the processing element node communications scheduling table 60 associated with dimensions of lower order to be transferred over the communications link 12 associated with the lowest higher-order dimension address bit to be interchanged. Thus, in the above example, the sequencer 15 will enable the processing element nodes 11 to transfer data items in locations identified by entries $s_{i,j}$ associated with dimensions "0" through "J-1" to be serially transferred over the communications link 12 associated with dimension "J." The sequencer 15 will enable the processing element nodes 11 to store the received data items which they receive in locations in their respective memories 21 identified by the corresponding entries $s_{i,j}$ of their processing element node communications scheduling table 60. That is, when the sequencer 15 enables the processing element nodes 11 to transmit the data item in the location identified by the entry $s_{i,j}$ associated with dimension 0, for example, in their tables 60 over the respective communications link 12 associated with dimension "J," the sequencer 15 enables the receiving processing element nodes 11 to store the data items in the locations of their respective memories 21 identified by the same entry.

The sequencer may enable similar operations if there are gaps in the sequence of address bits $i_K \ldots i_J$ and $j_K \ldots j_J$ to be interchanged. In particular, if data items represented by addresses are to be transferred so as to interchange the address bits as described above, except that address bits $i_Y \ldots i_X$ and $j_Y \ldots j_X$, where $K>Y>X>J$, are not to be interchanged, the sequencer 15 will enable the processing element nodes 11 to transfer data items in locations identified by entries $s_{i,j}$ associated with dimensions "X" through "Y" to be serially transferred over the communications link 12 associated with dimension "Y+1," that is, the communications link 12 associated with the lowest higher-order dimension address bit above the gap that is to be interchanged. As described above, the sequencer 15 will enable the processing element nodes 11 to store the received data items which they receive in locations in their respective memories 21 identified by the corresponding entries $s_{i,j}$ of their processing element node communications scheduling table 60, as described above.

As noted above, the all-to-all communications arrangement can be used to in connection with transfer operations required for other types of data manipulation in parallel processing array 10. In, for example, Fast Fourier Transform (FFT) operations, a transfer operation termed a "bit reversal" is required, in which the data items are transferred from a storage location 21(z) of a source processing element node 11(x) to a storage location 21(z') of a destination processing element node 11(x') such that, for each data item, the binary representation of the hypercube address concatenated with the offset of the destination processing element node 11(x') is the reverse of that for the source processing element node 11(x). To accommodate such a transfer operation, the sequencer 15 performs, and enables the processing element nodes 11(x) to perform, similar operations as described above, with the exception that, in generating the processing element node communications scheduling table 60, it enables the processing element nodes to perform an exclusive-OR operation between the values $w_{i,j}$ of the base communications table and the bit-wise reverse of the respective processing element nodes' hypercube addresses. The result will be the required table 60 to accomplish the transfer operation.

Although the computer system has been described, in connection with FIG. 1, as having both a host computer 16 and a sequencer 15, it will be appreciated that a the system may have a single unit that performs the operations of both as described above. In addition, the computer system may have processing elements 20 of diverse internal construction from that depicted in FIG. 2.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A computer system comprising:
   A. a processing element array comprising a plurality of processing element nodes interconnected by a hypercube network having a plurality of dimensions, each processing element node having a memory including a plurality of storage locations for storing data, each processing element node further having a network address, and
   B. control means for controlling said processing element nodes in parallel to enable data items to be transferred in a selected manner among the storage locations of the processing element nodes in a series of communications steps, said control means comprising:

i. base communications table generating means for generating a base communications table including a plurality of entries organized in rows and columns, entries in respective columns of the base communications table being associated with respective ones of the dimensions of the hypercube network, and entries in successive rows being associated with successive ones of said communications steps;

ii. processing element node communications schedule table enabling means for enabling the processing element nodes of the processing element array to generate respective processing element node communications schedule tables each having a plurality of schedule table entries organized in rows and columns, respective columns of the processing element node communications schedule table for each processing element node being associated with respective ones of the dimensions of the hypercube network and entries in successive rows being associated with successive ones of the communications steps, processing element node communications schedule table enabling means enabling the processing element nodes to generate the schedule table entries a selected function of the base table entries of the base communications table and the processing element nodes' respective network addresses, schedule table entries of each processing element node communications schedule table associating, for each of the series of communications steps, storage locations of the processing element node's memory with respective dimensions of the hypercube, and iii. communications enabling means for enabling the processing element nodes to, in parallel in each of the series of communications steps, transfer data in storage locations identified by the schedule table entries in the row of the processing element nodes' respective processing element node communications schedule tables associated with the communication step over the dimensions associated with the schedule table entries' respective columns.

2. A computer system as defined in claim 1 in which the selected function performed by the processing element node communications schedule table enabling means is an exclusive-OR operation.

3. A computer system as defined in claim 1 in which said base communications table associates, for a selected one of said processing element nodes, storage locations of the selected processing element node's memory with respective dimensions of the hypercube for a selected one of said processing element nodes.

4. A computer system as defined in claim 1 in which the base communications table generated by the base communications table generating means includes a plurality of base communications table entries arranged in rows and columns, said base communications table generating means generating each base communications entry as a function of its row and column position in the base communications table.

5. A computer system as defined in claim 1 in which the base communications table generated by the base communications table generating means includes a plurality of base communications table entries arranged in rows and columns, said base communications table generating means generating each base communications table entry to have the characteristic that:

A. a bit in the binary representation of the entry whose order is associated with the column of the entry is set;

B. no two entries in any one of said rows have corresponding values; and

C. no two entries in any one of said columns have corresponding values.

6. A computer system as defined in claim 5 in which said base communications table generating means includes:

A. row generating means for generating, for each said row, (i) a row index value corresponding to the row's location in the base communications table, and (2) row base values as a function of its the row's row index value, with a predetermined one of the bits of each base value's binary representation being set;

B. bit conditioning means for establishing, for each row base value, the conditions of selected ones of the bits of the base value's binary representation, said bit conditioning means including:

i. adjacent column conditioning means for setting, for each row base value, a bit of the base value's binary representation adjacent the bit of the binary representation corresponding to the base value's column position; and ii. column condition means for interchanging, for each row base value, a bit of the binary value's binary representation corresponding to the base value's column position with the predetermined set bit.

7. A control arrangement for use in a computer system comprising a processing element array comprising a plurality of processing element nodes interconnected by a hypercube network having a plurality of dimensions, each processing element node having a memory including a plurality of storage locations for storing data, each processing element node further having a network address, the control arrangement for controlling said processing element nodes in parallel to enable data items to be transferred in a selected manner among the storage locations of the processing element nodes in a series of communications steps, said control arrangement comprising:

A. base communications table generating means for generating a base communications table including a plurality of entries organized in rows and columns, entries in respective ones of the columns of the base communications table being associated with respective one of the dimensions of the hypercube network, and entries in successive rows being associated with successive ones of said communications steps;

B. processing element node communications schedule table enabling means for enabling the processing element nodes of the processing element array to generate respective processing element node communications schedule tables each having a plurality of schedule table entries organized in rows and columns, respective columns of the processing element node communications schedule table for each processing element node being associated with respective ones of the dimensions of the hypercube network and entries in successive rows being associated with successive ones of the communications steps, processing element node communications schedule table enabling means enabling the processing element nodes to generate the schedule table entries as a selected function of the base table entries of the base communications table and their respective network addresses, schedule table entries of each processing element node communications schedule table associating, for each of the series of communications steps, storage locations of the processing element node's memory with respective dimensions of the hypercube, and C. communications enabling means for enabling the processing element nodes to, in parallel in each of the series of communications steps, transfer data in storage locations identified by the schedule table entries in the row of the processing element nodes' respective processing element node communications schedule tables associated with the communication step over the dimensions associated with the schedule table entries' respective columns.

8. A control arrangement as defined in claim 7 in which the selected function performed by the processing element node communications schedule table enabling means is an exclusive-OR operation.

9. A control arrangement as defined in claim 7 in which said base communications table associates, for a selected one of said processing element nodes, storage locations of the selected processing element node's memory with respective dimensions of the hypercube for a selected one of said processing element nodes.

10. A control arrangement as defined in claim 7 in which the base communications table generated by the base communications table generating means includes a plurality of base communications table entries arranged in rows and columns, said base communications table generating means generating each base communications entry as a function of its row and column position in the base communications table.

11. A control arrangement as defined in claim 7 in which the base communications table generated by the base communications table generating means includes a plurality of base communications table entries arranged in rows and columns, said base communications table generating means generating each base communications table entry to have the characteristic that:

A. a bit in the binary representation of the entry whose order is associated with the column of the entry is set;

B. no two entries in any one of said rows have corresponding values; and

C. no two entries in any one of said columns have corresponding values.

12. A control arrangement as defined in claim 11 in which said base communications table generating means includes:

A. row generating means for generating, for each said row, (i) a row index value corresponding to the row's location in the base communications table, and (2) row base values as a function of its the row's row index value, with a predetermined one of the bits of each base value's binary representation being set;

B. bit conditioning means for establishing, for each row base value, the conditions of selected ones of the bits of the base value's binary representation, said bit conditioning means including:

i. adjacent column conditioning means for setting, for each row base value, a bit of the base value's binary representation adjacent the bit of the binary representation corresponding to the base value's column position; and ii. column condition means for interchanging, for each row base value, a bit of the binary value's binary representation corresponding to the base value's column position with the predetermined set bit.

13. A method of controlling a processing element array comprising a plurality of processing element nodes interconnected by a hypercube network having a plurality of dimensions, each processing element node having a memory including a plurality of storage locations for storing data, each processing element node further having a network address, the method for enabling said processing element nodes to, in parallel, transfer data items in a selected manner among their respective storage locations in a series of communications steps, according to the steps of:

A. generating a base communications table including a plurality of base table entries organized in rows and columns, base table entries in respective ones of the columns of the base communications table being associated with respective one of the dimensions of the hypercube network, and base table entries in successive rows being associated with successive ones of said communications steps;

B. enabling the processing element nodes of the processing element array to generate respective processing element node communications schedule tables each having a plurality of schedule table entries organized in rows and columns, respective columns of the processing element node communications schedule table for each processing element node being associated with respective ones of the dimensions of the hypercube network and entries in successive rows being associated with successive ones of the communications steps, processing element node communications schedule table enabling means enabling the processing element nodes to generate the schedule table entries as a selected function of the base table entries of the base communications table and their respective network addresses, schedule table entries of each processing element node communications schedule table associating, for each of the series of communications steps, storage locations of the processing element node's memory with respective dimensions of the hypercube, and C. enabling the processing element nodes to, in parallel in each of the series of communications steps, transfer data in storage locations identified by the entries in the row of the processing element nodes' respective processing element node communications schedule tables associated with the communication step over the dimensions associated with the schedule table entries' respective columns.

14. A method as defined in claim 13 in which the selected function performed during the processing element node communications schedule table enabling step is an exclusive-OR operation.

15. A method as defined in claim 13 in which, in said base communications table, for a selected one of said processing element nodes, storage locations of the selected processing element node's memory are associated with respective dimensions of the hypercube for a selected one of said processing element nodes.

16. A method as defined in claim 13 in which the base communications table includes a plurality of base communications table entries arranged in rows and columns, each base communications entry being generated as a function of its row and column position in the base communications table.

17. A method as defined in claim 13 in which the base communications table includes a plurality of base communications table entries arranged in rows and columns, each base communications table entry having the characteristic that:
   A. a bit in the binary representation of the entry whose order is associated with the column of the entry is set;
   B. no two entries in any one of said rows have corresponding values; and
   C. no two entries in any one of said columns have corresponding values.

18. A method as defined in claim 17 in which said base communications table is generated according to the steps of:
   A. generating, for each said row, (i) a row index value corresponding to the row's location in the base communications table, and (2) row base values as a function of its the row's row index value, with a predetermined one of the bits of each base value's binary representation being set;
   B. establishing, for each row base value, the conditions of selected ones of the bits of the base value's binary representation, according to the steps of:
      i. setting, for each row base value, a bit of the base value's binary representation adjacent the bit of the binary representation corresponding to the base value's column position; and
      ii. interchanging, for each row base value, a bit of the binary value's binary representation corresponding to the base value's column position with the predetermined set bit.

* * * * *